Patented Apr. 1, 1952

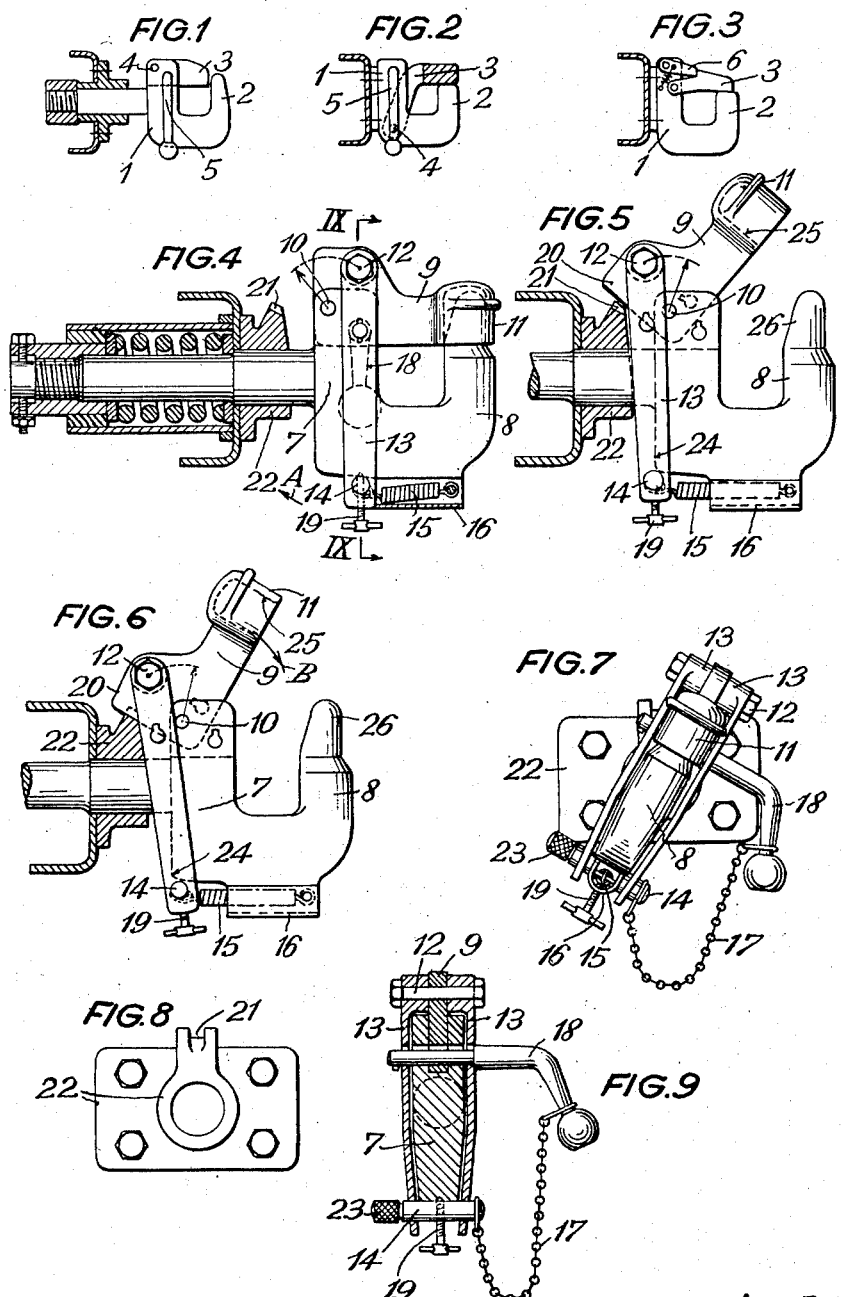

2,591,487

UNITED STATES PATENT OFFICE 2,591,487

DRAW HOOK WITH LOCK CAP FOR TRAILERS

Ernst Wirz, Zurich, Switzerland

Application October 25, 1948, Serial No. 56,349
In Switzerland October 24, 1947

6 Claims. (Cl. 280—33.9)

(Granted under the provisions of sec. 14, act of
March 2, 1927; 357 O. G. 5)

My present invention relates to improvements in draw-hooks with locking means for trailers.

The most common draw-hooks with locking means for vehicles, as known in the art, have the three forms shown in Figs. 1–3 of the accompanying drawing. In these views, the numeral 1 designates the hook body with the end portion 2, and 3 the lock arm. In the known form according to Fig. 1, the catch 3 is pivoted on a pin 4 to the hook body 2, and is secured in the closing position by a key bolt 5, the operative end portion of which is bent off at right angles. The second form, shown in Fig. 2, differs from that shown in Fig. 1 in that the lock arm is fulcrumed to the bottom portion of the hook body. In the third form, shown in Fig. 3, the lock arm 3 is secured in the closing position by means of a spring-loaded dog 6.

In all these known prior forms, the studlike draw-hook end portion 2 is subject to unilateral bending stresses. The said end may break off due to wear and fatigue. The simple locking of the arm 3 in its closing position by means of a key bolt 5, is insufficient, since—when the bolt fails or is improperly set—the lock arm is no longer secured and may swing open. It has been shown that in such known draw-hooks, accidents will occur time and again due to a bending or breakage of the end portions or due to an insufficient locking of the arm, in that the trailing vehicles become loose and seriously endanger the public.

It is a principal object of my present invention to attain a degree of safety higher than that afforded by known prior forms of pull hooks with lock means, in that the latter in the closing position so connects the hook body to the hook end portion as to avoid the occurrence of substantial bending stresses.

One form of my present invention is shown in the Figs. 4–9 of the accompanying drawing, in which—

Fig. 4 shows a side view of the pull hook with the lock cap in the closing position, Fig. 5 a similar view, but with the lock cap nearly in the wide open position, Fig. 6 a similar view, but with the lock cap swung fully open, Fig. 7 a rear view of the pull hook with the lock cap in the closed position and the hook skewed, Fig. 8 a rear view of the flange bearing, and Fig. 9 a section on the line IX—IX of Fig. 4.

In the Figs. 4–9, the hook body 7 has a studlike end portion 8. The closing cap 9 is pivoted on a pin 10 to the hook body 7, and comprises at its free end a tubular cap portion 11 fitting over the studlike hook end portion 8. A stirrup 13 is pivoted on the bolt 12 to the cap 9. A pin 14 is inserted in the lower end portions of the stirrup 13 and is loaded by a spring 15 which is disposed in a housing 16 secured to the hook body 7. A key bolt 18 is connected to the pin 14 through a chain 17. The bolt 18 is pluggable in apertures (Fig. 9) provided in the two legs of the stirrup 13, the cap 9 and the hook body 7. A screw 19 is engaged in the pin 14 which on tightening also is engaged in the hook body 7 so as to secure the pin 14 or, respectively, the stirrup 13 in the closing position of the cap 9 as shown in Fig. 1.

The rear portion 20 of the cap 9 may enter, in the open position, into a slot 21 of the flange bearing 22, when the hook is swung wide open (Fig. 6). The slot 21 and the flange bearing 22 therefore form a catch abutment to lock the hook body and lock cap perpendicularly in their inoperative position. The flange bearing 22 is fixed to the frame of the draft vehicle.

In order to open the closed pull hook, it is necessary to first loosen the screw 19 and to withdraw the key bolt 18. The stirrup 13 then must be rocked in direction of the arrow A (Fig. 4) on the bolt 12, to which end the pin 14 is provided with a knob 23. The lock cap only can be swung open after the pin 14 has been swung beyond the corner 24 of the hook body 7. In Fig. 5, the cap 9 is shown in an intermediate open position in which the hook 7, 8 and cap 9 are not perpendicular or plumb as seen in a plane at right angles to that of Fig. 5. When the hook and cap are perpendicular, the rear portion 20 of the latter is engaged in the retaining slot 21 of the flanged bearing 22 (Fig. 6). In the intermediate open position of cap 9 according to Fig. 5 and in its wide open position according to Fig. 6, the pin 14 is swung to the right through the spring 15, so that the stirrup 13—the pivot 12 of which has moved beyond the dead-center position with respect to the pin 10—holds the lock cap 9 open. In the position shown in Fig. 6, the hook 7, 8 and the cap 9, 11 are secured against rotation in a plane at right angles to that of Fig. 6, so as to facilitate the coupling of a trailer.

In the closed position of the lock cap 9, 11, as shown in Fig. 4, the draw-hook and lock cap may swing about their longitudinal axis, as may be seen in Fig. 7. The distance between the flanged bearing 22 and the hook body 7 is so chosen as to permit to open the lock cap in any position of rotation of the hook body, e. g. in the position shown in Fig. 7.

The lock cap 9 may be closed by swinging back in direction of the arrow B. The fulcrum 10 of the lock cap 9 is situated at such elevation on the hook body 7 as to make the inside surface 25 of the cap proper 11 fit perfectly the surface 26 of the stud 8.

What I claim and desire to secure by Letters Patent is:

1. A draw hook of the spring loaded swivel type for trailers adapted to be fixed to the frame of a draft vehicle, comprising a swiveled hook body having a stud-like end portion, a lock cap pivoted to the hook body, the free end of said cap being adapted to fit over the said hook end portion in its locked position for assisting in the prevention of bending of the hook when loaded, stirrup means pivoted to the lock cap and adapted to secure the latter to the hook in the closed position to avoid an inadvertent opening thereof, a spring connected at one end to the stirrup means and at the other end to the hook body, said spring adapted to bias the stirrup means into its locking position, and a casing fixed to the hook body and in which the spring is disposed.

2. A draw hook of the spring loaded swivel type for trailers adapted to be fixed to the frame of a draft vehicle, comprising a swiveled hook body having a stud-like end portion, a lock cap pivoted to the hook body, the free end of said cap being adapted to fit over the said hook end portion in its locked position for assisting in the prevention of bending of the hook when loaded, stirrup means pivoted to the lock cap and adapted to secure the latter to the hook in the closed position to avoid an inadvertent opening thereof, a spring connected at one end to the stirrup means and at the other end to the hook body, said spring adapted to bias the stirrup means into its locking position, holes provided in the hook body and cap and stirrup means, such holes registering with each other in the closed position of the cap, and a key bolt adapted to be passed through the said registering holes for locking the lock cap and stirrup means in the closed position.

3. A draw hook of the spring loaded swivel type for trailers adapted to be fixed to the frame of a draft vehicle, comprising a swiveled hook body having a stud-like end portion, a lock cap pivoted to the hook body, the free end of said cap being adapted to fit over the said hook end portion in its locked position for assisting in the prevention of bending of the hook when loaded, stirrup means pivoted to the lock cap and adapted to secure the latter to the hook in the closed position to avoid an inadvertent opening thereof, a spring connected at one end to the stirrup means and at the other end to the hook body, said spring adapted to bias the stirrup means into its locking position, and a set-screw engageable with the stirrup means for the purpose of securing the latter to the hook body.

4. A draw hook of the spring loaded swivel type for trailers adapted to be fixed to the frame of a draft vehicle, comprising a swiveled hook body having a stud-like end portion, a lock cap pivoted to the hook body, the free end of said cap being adapted to fit over the said hook end portion in its locked position for assisting in the prevention of bending of the hook when loaded, stirrup-means pivoted to the lock cap and adapted to secure the latter to the hook in the closed position to avoid an inadvertent opening thereof, a spring connected at one end to the stirrup means and at the other end to the hook body, said spring adapted to bias the stirrup means into its locking position, and a catch abutment fixed to the said frame and adapted to lock the hook body and cap perpendicularly in their inoperative position, whereby the fulcrum of the stirrup means on the lock cap in the open position of the lock cap is arranged between the fulcrum of the lock cap on the hook body and the said catch abutment so that the stirrup means secure the lock cap in the open position.

5. A draw hook of the spring loaded swivel type for trailers adapted to be fixed to the frame of a draft vehicle, said hook comprising a swiveled hook body having a stud-like end portion, a lock cap pivoted to the hook body, the free end of said cap being adapted to fit over the said hook end portion in its locked position for assisting in the prevention of bending of the hook when loaded, a yoke pivoted to the lock cap, said yoke having depending arms, and means on the free ends of said arms adapted to engage beneath the hook body when the cap is pivoted into its locked position to prevent inadvertent opening of said lock cap.

6. A draw hook of the spring loaded swivel type for trailers adapted to be fixed to the frame of a draft vehicle, said hook comprising a swiveled hook body having a stud-like end portion, a lock cap pivoted to the hook body, the free end of said cap being adapted to fit over the said hook end portion in its locked position for assisting in the prevention of bending of the hook when loaded, a yoke pivoted to the lock cap, the pivoted connection between the yoke and the cap being situated intermediate the pivotal connection between the cap and hook body and the free end of the cap when the latter is in locked position, said yoke having depending arms, means on the free ends of the arms adapted to engage beneath the hook body when the cap is pivoted to its locked position, and means on the hook body connected to the free ends of said depending arms to urge said free ends into engagement with the hook body and to maintain said ends in engaged position to prevent inadvertent opening of said lock cap.

ERNST WIRZ.

REFERENCES CITED

The following references are of record in the file of this patent:

UNITED STATES PATENTS

| Number | Name | Date |
|---|---|---|
| 1,379,133 | Speece | May 24, 1921 |
| 2,239,320 | Haniquet | Apr. 22, 1941 |
| 2,370,679 | Martinelli et al. | Mar. 6, 1949 |
| 2,515,856 | Brougher | July 18, 1950 |

FOREIGN PATENTS

| Number | Country | Date |
|---|---|---|
| 460,462 | Great Britain | Jan. 28, 1937 |